United States Patent
Swenson et al.

(10) Patent No.: US 8,009,981 B2
(45) Date of Patent: Aug. 30, 2011

(54) TESTING OF TRANSMITTERS FOR COMMUNICATION LINKS BY SOFTWARE SIMULATION OF REFERENCE CHANNEL AND/OR REFERENCE RECEIVER

(75) Inventors: Norman L. Swenson, Mountain View, CA (US); Paul Voois, Ladera Ranch, CA (US); Thomas A. Lindsay, Brier, WA (US); Steve C. Zeng, Sunnyvale, CA (US)

(73) Assignee: ClariPhy Communications, Inc., Irvine, CA (US)

( * ) Notice: Subject to any disclaimer, the term of this patent is extended or adjusted under 35 U.S.C. 154(b) by 0 days.

(21) Appl. No.: 12/651,721

(22) Filed: Jan. 4, 2010

(65) Prior Publication Data
US 2010/0103839 A1    Apr. 29, 2010

Related U.S. Application Data

(63) Continuation of application No. 11/316,115, filed on Dec. 21, 2005, now Pat. No. 7,643,752.

(60) Provisional application No. 60/638,788, filed on Dec. 22, 2004, provisional application No. 60/641,834, filed on Jan. 5, 2005, provisional application No. 60/643,234, filed on Jan. 11, 2005, provisional application No. 60/677,911, filed on May 4, 2005, provisional application No. 60/690,190, filed on Jun. 13, 2005, provisional application No. 60/698,435, filed on Jul. 11, 2005, provisional application No. 60/701,637, filed on Jul. 21, 2005, provisional application No. 60/707,282, filed on Aug. 10, 2005, provisional application No. 60/710,512, filed on Aug. 22, 2005, provisional application No. 60/713,867, filed on Sep. 1, 2005.

(51) Int. Cl.
*H04B 10/00* (2006.01)
(52) U.S. Cl. ............................. 398/16; 398/25; 398/26
(58) Field of Classification Search ............... 398/9–38, 398/182–201
See application file for complete search history.

(56) References Cited

U.S. PATENT DOCUMENTS

| | | | | |
|---|---|---|---|---|
| 5,652,668 | A * | 7/1997 | Aulet et al. | 398/23 |
| 5,774,242 | A * | 6/1998 | O'Sullivan et al. | 398/29 |
| 6,229,631 | B1 * | 5/2001 | Sato et al. | 398/30 |
| 6,233,073 | B1 * | 5/2001 | Bowers et al. | 398/16 |
| 6,259,543 | B1 * | 7/2001 | Golovchenko et al. | 398/26 |
| 6,330,381 | B1 * | 12/2001 | Lu et al. | 385/24 |
| 6,377,552 | B1 * | 4/2002 | Moran et al. | 370/241 |
| 6,385,552 | B1 * | 5/2002 | Snyder | 702/123 |
| 6,477,311 | B2 * | 11/2002 | Ishizaka | 385/147 |
| 6,560,720 | B1 * | 5/2003 | Chirashnya et al. | 714/32 |
| 6,580,531 | B1 * | 6/2003 | Swanson et al. | 398/5 |
| 6,768,577 | B2 * | 7/2004 | Eggleton et al. | 359/335 |
| 6,832,051 | B2 * | 12/2004 | Lu et al. | 398/158 |
| 6,865,343 | B1 * | 3/2005 | Bierhoff et al. | 398/25 |
| 6,956,642 | B2 * | 10/2005 | Franke et al. | 356/73.1 |
| 7,095,956 | B2 * | 8/2006 | Levandovsky et al. | 398/27 |

(Continued)

*Primary Examiner* — Agustin Bello
(74) *Attorney, Agent, or Firm* — Fenwick & West LLP

(57) ABSTRACT

A transmitter for a communications link is tested by using a (software) simulation of a reference channel and/or a reference receiver to test the transmitter. In one embodiment for optical fiber communications links, a data test pattern is applied to the transmitter under test and the resulting optical output is captured, for example by a sampling oscilloscope. The captured waveform is subsequently processed by the software simulation, in order to simulate propagation of the optical signal through the reference channel and/or reference receiver. A performance metric for the transmitter is calculated based on the processed waveform.

21 Claims, 7 Drawing Sheets

U.S. PATENT DOCUMENTS

| | | | |
|---|---|---|---|
| 7,102,739 B2 * | 9/2006 | Endo et al. | 356/73.1 |
| 7,154,924 B2 * | 12/2006 | Sanchez | 372/29.02 |
| 7,161,666 B2 * | 1/2007 | French et al. | 356/73.1 |
| 7,187,435 B2 * | 3/2007 | Franke et al. | 356/73.1 |
| 7,233,962 B2 * | 6/2007 | Summerfield et al. | 708/2 |
| 7,263,287 B2 * | 8/2007 | Xu | 398/27 |
| 7,280,765 B2 * | 10/2007 | Chowdhury et al. | 398/159 |
| 7,363,562 B2 * | 4/2008 | Waschura et al. | 714/731 |
| 2005/0191059 A1 * | 9/2005 | Swenson et al. | 398/159 |
| 2006/0067688 A1 * | 3/2006 | Inman et al. | 398/45 |
| 2006/0069971 A1 * | 3/2006 | Waschura et al. | 714/724 |
| 2006/0291869 A1 * | 12/2006 | Lindsay et al. | 398/183 |
| 2007/0036084 A1 * | 2/2007 | Lindsay et al. | 370/246 |
| 2008/0101794 A9 * | 5/2008 | Swenson et al. | 398/23 |

* cited by examiner

TESTING OF TRANSMITTERS FOR COMMUNICATION LINKS BY SOFTWARE SIMULATION OF REFERENCE CHANNEL AND/OR REFERENCE RECEIVER

CROSS-REFERENCE TO RELATED APPLICATION(S)

This application is a continuation of U.S. patent application Ser. No. 11/316,115, "Testing of Transmitters for Communication Links by Software Simulation of Reference Channel and/or Reference Receiver," filed Dec. 21, 2005, which claims priority under 35 U.S.C. §119(e) to each of the following U.S. Provisional Patent Applications: Ser. No. 60/638,788, "Proposed TP-2 Test Methodology," filed Dec. 22, 2004; Ser. No. 60/641,834, "Proposed TP-2 Test Methodology," filed Jan. 5, 2005; Ser. No. 60/643,234, "Proposed TP-2 Test Methodology with MATLAB Script," filed Jan. 11, 2005; Ser. No. 60/677,911, "New Approach To Measure Tx Signal Strength And Penalty," filed May 4, 2005; Ser. No. 60/690,190, "Improvements To Transmit Waveform And Dispersion Penalty Algorithm," filed Jun. 13, 2005; Ser. No. 60/698,435, "Method To Accurately Measure Bias And Optical Modulation Amplitude For a Distorted Optical Waveform," filed Jul. 11, 2005; Ser. No. 60/701,637, "Method To Extract Square-Wave-Based Bias And Optical Modulation Amplitude For A Distorted Optical Waveform," filed Jul. 21, 2005; Ser. No. 60/707,282, "Method To Extract Square-Wave-Based Bias And Optical Modulation Amplitude For A Distorted Optical Waveform," filed Aug. 10, 2005; Ser. No. 60/710,512, "Computation Of Optimal Offset For A Transmitter Waveform And Dispersion Penalty," filed Aug. 22, 2005; and Ser. No. 60/713,867, "Transmitter Waveform And Dispersion Penalty Test Using A Short Equalizer, OMSD Normalization, And Optimal Offset Computation," filed Sep. 1, 2005. The subject matter of all of the foregoing are incorporated herein by reference in their entirety.

BACKGROUND OF THE INVENTION

1. Field of the Invention

This invention relates generally to the use of software simulation (which is intended to include firmware simulation) in testing of transmitters used in communications links, for example the testing of transmitters used in optical fiber communications link by software simulation of a reference channel (i.e., a reference optical fiber link) and/or a reference receiver.

2. Description of the Related Art

Optical fiber is widely used as a communications medium in high speed digital networks, including local area networks (LANs), storage area networks (SANs), and wide area networks (WANs). There has been a trend in optical networking towards ever-increasing data rates. While 100 Mbps was once considered extremely fast for enterprise networking, attention has recently shifted to 10 Gbps, 100 times faster. As used in this application, 10 Gigabit (abbreviated as 10 G or 10 Gbps) systems are understood to include optical fiber communication systems that have data rates or line rates (i.e., bit rates including overhead) of approximately 10 Gigabits per second.

Regardless of the specific data rate, application or architecture, communications links (including optical fiber communications links) invariably include a transmitter, a channel and a receiver. In an optical fiber communications link, the transmitter typically converts the digital data to be sent to an optical form suitable for transmission over the channel (i.e., the optical fiber). The optical signal is transported from the transmitter to the receiver over the channel, possibly suffering channel impairments along the way, and the receiver then recovers the digital data from the received optical signal.

For example, a typical 10 G optical fiber communications link 100 is shown in FIG. 1. The link 100 includes a transmitter 105 coupled through optical fiber 110 (the channel) to a receiver 120. A typical transmitter 105 may include a serializer, or parallel/serial converter (P/S) 106 for receiving 10 G data from a data source on a plurality of parallel lines and providing serial data to a 10 G laser driver 107. The driver 107 then drives a 10 G laser source 108, which launches the optical waveform carrying the digital data on optical fiber 110.

On the receive side, a typical receiver 120 includes a 10 G photodetector 111 for receiving and detecting data from the optical fiber 110. The detected data is typically processed through a 10 G transimpedance amplifier 112, a 10 G limiting amplifier 113, and a 10 G clock and data recovery unit 114. The recovered data may then be placed on a parallel data interface through a serial/parallel converter (S/P) 115.

Standards play an important role in networking and communications. Since components in the network may come from different vendors, standards ensure that different components will interoperate with each other and that overall system performance metrics can be achieved even when components are sourced from different vendors. For example, standards for transmitters can be used to ensure that, when compliant transmitters are combined with a compliant channel and compliant receivers, the overall link will meet certain minimum performance levels. As a result, manufacturers of transmitters typically will want to test their transmitters for compliance with the relevant standards as part of their production process.

However, current testing approaches, which were developed for earlier generation optical fiber communications links, may not be suitable for the more advanced systems that are currently being developed and fielded. In one testing approach, transmitters are tested based on the quality of their immediate output. For example, the signal to noise ratio (SNR), bit error rate, eye diagram or other performance metric may be measured at the output of the transmitter. This approach ignores interactions between the transmitter and other components in the system (e.g., the optical fiber and the receiver) and, as a result, may be too simplistic to give an accurate assessment of the overall system performance achievable by the transmitter. For example, if the optical fiber communications link is designed so that the receiver compensates for distortions or other impairments introduced by the channel or the transmitter, a direct measurement of the performance at the transmitter output may not accurately reflect this subsequent compensation. In fact, in certain systems, it may be difficult to obtain an accurate assessment of the performance of the transmitter based only on its immediate output. Similarly, standards for transmitters used in more advanced systems may be based in part on their interaction with other components. For example, if the standard assumes a certain type of distortion mitigation in the receiver, the transmitter may be allowed a certain level of distortion that the receiver can compensate, but other types of distortion that the receiver cannot compensate should be limited. A transmitter test that cannot distinguish between the two types of distortion (an eye diagram, for example) will be an inadequate compliance test for this type of standard. Hence, a test of the transmitter alone may not be sufficient to determine whether the transmitter complies with the standard.

Another testing approach uses hardware reference components to emulate the overall optical fiber communications link. For example, there are a number of standards that relate to 10 G fiber networks. 10 G Ethernet over optical fiber is specified in *IEEE Std 802.3ae-2002 Media Access Control (MAC) Parameters, Physical Layers, and Management Parameters for* 10 *Gb/s Operation* (abbreviated herein as IEEE 802.3ae). The IEEE 802.3ae standard includes a Transmitter and Dispersion Penalty (TDP) measurement. The TDP measurement was developed as a transmitter compliance test to ensure that a compliant transmitter will communicate with a compliant receiver over a compliant channel with acceptable performance. The TDP measurement involves signal quality characteristics such as rise and fall times, eye pattern opening, jitter, and other distortion measurements. The intent is to insure that the signal received from a compliant transmitter can be detected to deliver a specified bit error rate.

The TDP measurement technique described in the 802.3ae standard involves a hardware test setup, including a hardware reference transmitter, the transmitter under test, a reference channel (i.e., actual length of fiber), and a hardware reference receiver. The test proceeds as follows. A reference link is established by connecting the reference transmitter to the reference receiver via the reference channel. The performance of the reference link is measured. A test link is established by connecting the transmitter under test to the reference receiver via the reference channel. The performance of this link is also measured. The performance of the reference link is compared with the performance of the test link to arrive at a value of TDP. The reference transmitter and reference receiver are high-quality instrument-grade devices. The test procedure involves several manual calibration and measurement steps. There are several disadvantages to this approach.

One disadvantage is the need for a hardware reference transmitter, a hardware reference channel, and a hardware reference receiver. The reference transmitter, channel, and receiver have tightly defined characteristics and are therefore very expensive. For example, the reference transmitter has tight specifications on rise and fall times, optical eye horizontal and vertical closure, jitter, and relative intensity noise (RIN). Furthermore, it is possible that different reference transmitters, channels, or reference receivers might yield different results due to parameter tolerances, environmental conditions (temperature, aging), and other differences. Therefore, the recommended measurement procedure involves a number of complex and sensitive calibration steps. The accuracy of the TDP measurement is sensitive to these time consuming and difficult calibration steps. Since these calibration steps all have tolerances, there may be significant variation in the results.

Another disadvantage is that the hardware approach is not easily extendible to other standards. Another standards committee is IEEE 802.3aq, which is developing a standard (10 GBASE-LRM) for 10 G Ethernet over multi-mode fiber over distances of up to 220 meters using electronic dispersion compensation (EDC). This standard is in a draft state, currently documented in *IEEE Draft P802.3aq/D3.0, Draft amendment to: IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Physical Layer and Management Parameters for* 10 *Gb/s Operation, Type* 10 *GBASE-LRM*, referred to herein as IEEE 802.3aq/D3.0. The use of EDC in the receiver allows communication over longer distances and/or use of lower cost components. Some of the added waveform distortions can be corrected in the EDC receiver. However, this leads to some problems in defining and measuring a metric for transmitter qualification.

For example, TDP is not an appropriate transmitter compliance test for 10 GBASE-LRM (EDC) systems because the reference receiver does not include equalization and does not accurately compensate for those distortions that a receiver using EDC can clean up. In general, there are certain signal impairments that can be corrected by an EDC receiver (such as most linear distortions), and there are other impairments that cannot normally be equalized (such as most nonlinear distortions). A suitable transmitter quality measure for an EDC system should measure the signal quality (or resulting bit error rate) achievable by a receiver with equalization. A reference receiver for such a system probably would include a decision feedback equalizer (DFE) as an EDC technique. However, a reference grade equalizer in the hardware receiver would be very difficult to make. It would have its own limitations, such as finite length and finite precision and tolerances, and these limitations could conceal the properties of the signal being measured. The resulting measurements may not accurately indicate correctable versus non-correctable impairments.

Another disadvantage with the use of TDP when applied to a transmitter intended for use on a link with an EDC receiver is the dependence of TDP on a measurement of Optical Modulation Amplitude (OMA). OMA is the difference in optical power for the nominal "1" and "0" levels of the optical signal. The measurement technique defined by 802.3ae is to capture samples of a test waveform using a sampling oscilloscope. The test waveform is the response of the transmitter to a square wave, which is a repetitive pattern of several consecutive 1's followed by an equal number of consecutive 0's. The mean optical power level of an optical 1 is measured over the center 20% of the time interval where the signal is high, and similarly for 0's when the signal is low. This is appropriate when the waveform is well-behaved in the sense that the levels during the measurement windows are constant and well-defined. However, a system that uses EDC in the receiver enables the use of lower cost transmitters that may result in distorted transmitted waveforms, for example as discussed further in U.S. patent application Ser. No. 11/033, 457, "Use of Low-Speed Components in High-Speed Optical Fiber Transceivers," filed Jan. 10, 2005. The response of the transmitter to a square wave input may differ dramatically from a well-behaved waveform due to bandlimiting, dispersion, and other distortions (such as ringing). This may make it difficult for an operator to accurately determine the true high and low levels. Since the value of TDP is sensitive to the measured OMA, this inaccuracy will directly affect the TDP measurement.

Thus, there is a need for improved transmitter testing techniques for communications links, including, for example, 10 G optical fiber communications links where the receiver includes EDC.

SUMMARY OF THE INVENTION

The present invention overcomes the limitations of the prior art by using a (software—including firmware) simulation of a reference channel and/or a reference receiver to test transmitters. A data test pattern (also referred to as a data sequence) is applied to the transmitter under test and the resulting output is captured, for example by a sampling oscilloscope. The captured waveform is subsequently processed by the software simulation, in order to simulate propagation of the signal through the reference channel and/or reference receiver. A performance metric for the transmitter is calculated based on the processed waveform.

In one embodiment, the performance metric is the transmitter waveform and dispersion penalty (TWDP). TWDP is defined as the difference (in dB) between a reference signal to noise ratio (SNR), and the equivalent SNR at the slicer input of a reference decision feedback equalizer (DFE) receiver for the measured waveform from the transmitter under test after propagation through a channel, such as an optical fiber reference channel.

In one approach, a data test pattern is applied to the transmitter under test and the transmitter output is sampled using standard test equipment. The captured waveform is processed through a software simulation of the reference channel and the reference receiver (which includes an equalizer). The use of a standard software simulation of the reference channel and the reference receiver avoids the difficulties inherent with a hardware receiver and allows a more accurate measurement of unequalizable signal impairments. The need for a hardware reference transmitter, channel, or reference receiver is eliminated, thus saving significant costs. In this way, TWDP can be measured for communication systems using EDC.

This approach has advantages since using a hardware reference receiver has significant problems. For example, the IEEE 802.3aq committee adopted the definition of one reference receiver based on PIE-D (Penalty for Ideal Equalizer—DFE), which corresponds to an infinite length DFE and can be computed analytically. However, an EDC receiver that can be reasonably implemented in hardware will have a finite length equalizer with limited arithmetic precision. Therefore, the results from a hardware reference receiver will not fully reflect the theoretical TWDP results and may be strongly influenced by the actual reference receiver implementation.

In one aspect of the invention, the signal output from the transmitter under test is captured by a sampling oscilloscope, and the resulting sampled signal is processed by a software simulation (including firmware simulations) of a reference channel and reference receiver. This enables the TWDP measurement to be performed using standard test equipment, rather than a very expensive instrument grade receiver. In one implementation, the reference equalizing receiver is implemented using a MATLAB simulation or other equivalent software simulation. Some or all of the software simulator may be integrated as part of the sampling oscilloscope (or other waveform capture device), provided as an add-on module to the sampling oscilloscope and/or implemented as a separate module.

The software simulator can also perform measurement of modulation amplitude (for example, optical modulation amplitude (OMA) in the case of an optical fiber channel) and waveform baseline. The computation of these quantities based on the captured waveform (including earlier or later processed versions of the captured waveform) eliminates the inaccuracies inherent in separate or manual measurements. For example, these quantities can be computed from the raw digitized waveform captured by the waveform capture device, from the waveform after some pre-processing (e.g., after re-sampling, truncation and/or data alignment) or from waveforms after simulation of propagation. Techniques are disclosed that yield more accurate measurements for highly distorted signals. This is advantageous because TWDP depends strongly on OMA, and the accurate measurement of OMA may be very difficult for distorted transmit waveforms that, in spite of this distortion, are acceptable when EDC is used in the receiver. In another variation, the software automatically corrects for the optimal DC offset (bias) value. Since the TWDP value is sensitive to offset of the waveform, automatic offset optimization improves reproducibility of the measured TWDP. This can be accomplished by adding an extra tap to the feedforward filter of the equalizer.

In another aspect of the invention, the simulated receiver uses a very long equalizer that approximates the performance of an infinite length equalizer. This is useful to establish a performance bound on practical length equalizers. In yet another aspect of the invention, a much shorter equalizer is used in the simulated receiver. The shorter equalizer more closely approximates the performance of a practically realizable receiver, but it requires additional optimization of equalizer delay and sampling phase, examples of which are also described herein.

Other aspects of the invention include methods and devices corresponding to the techniques described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
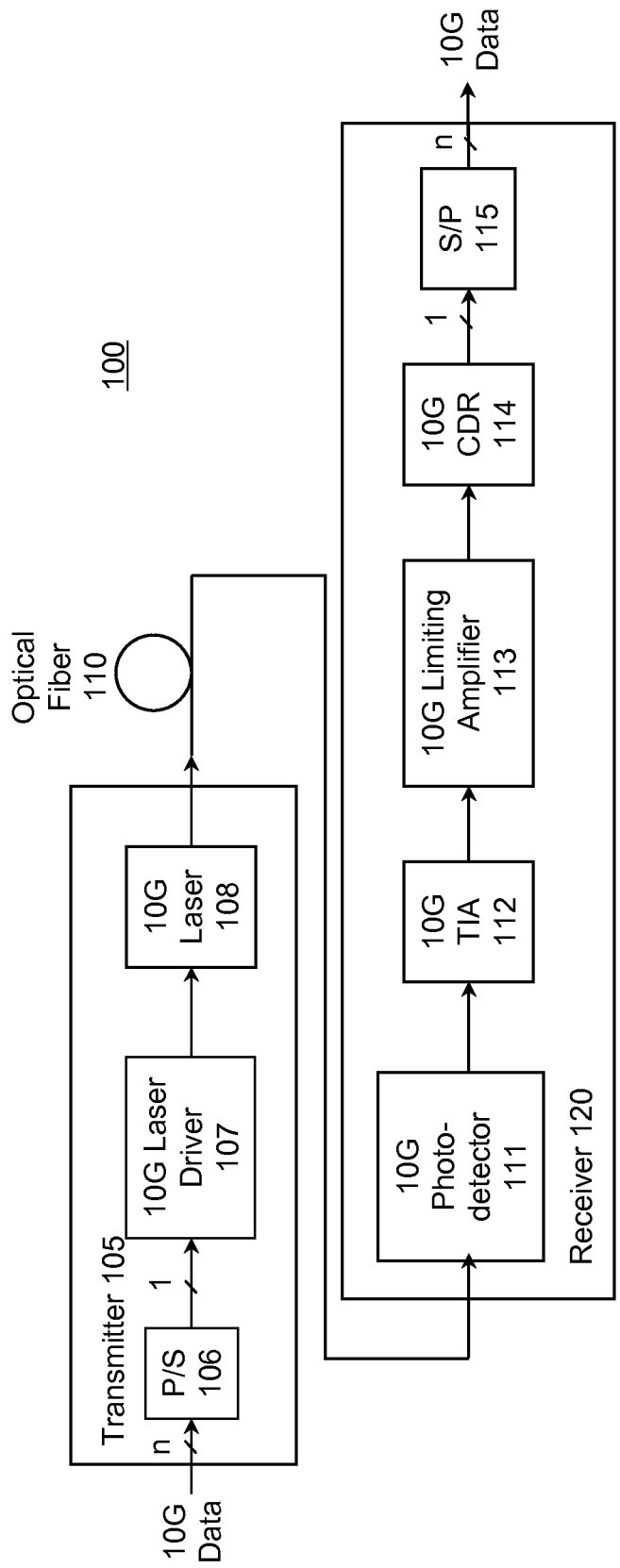
FIG. 1 (prior art) is a block diagram of a 10 G optical fiber communications link.
Figure 2:
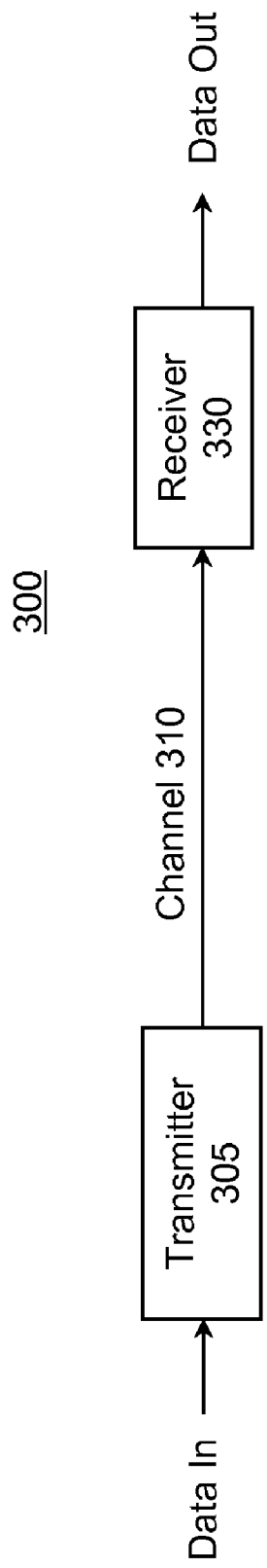
FIG. 2 is a block diagram of a communications link suitable for use with the invention.

FIG. 2 is a block diagram of a communications link 300 suitable for use with the current invention. The link 300 includes a transmitter 305 coupled through a channel 310 to a receiver 320. The overall system 300 may suffer from various impairments in transmitting data from the transmitter 305 to the receiver 320. The transmitters 305, channels 310 and receivers 320 may be various types, depending on the end application. Microwave, RF, cable, and optical fiber are some examples of different media for the channel 310. Different types of modulation may be used by the transmitter 305. Some examples are on-off keying, QAM, PSK, and OFDM. Similarly, the receiver 315 can also take the various forms corresponding to these different modulation formats.

Figure 3:
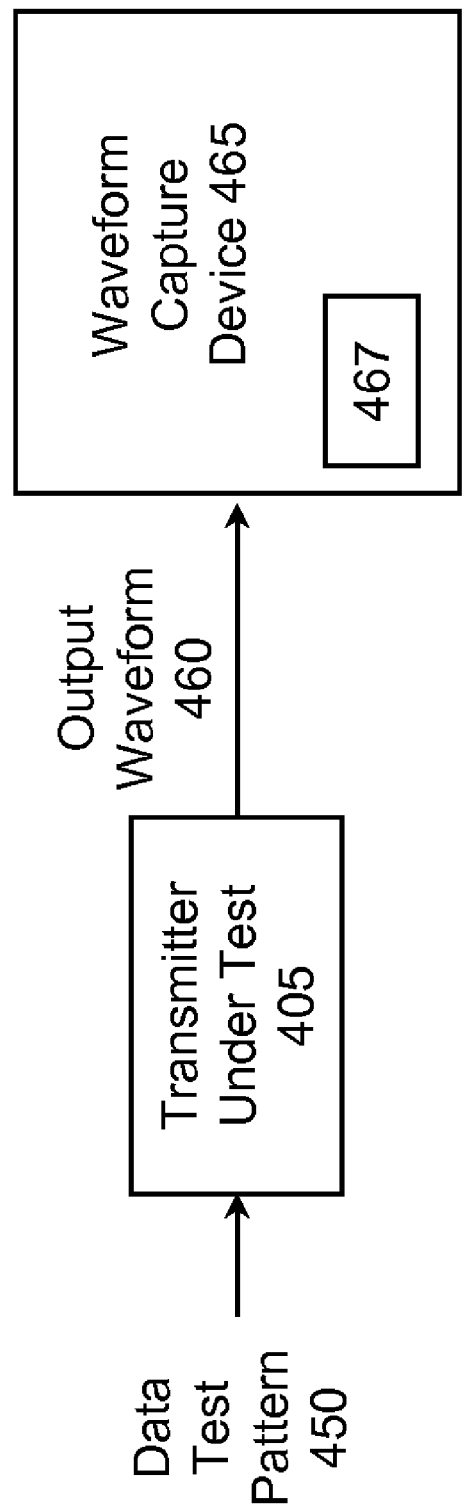
FIGS. 3 and 4 are block diagrams of a test system according to the invention.
Figure 4:
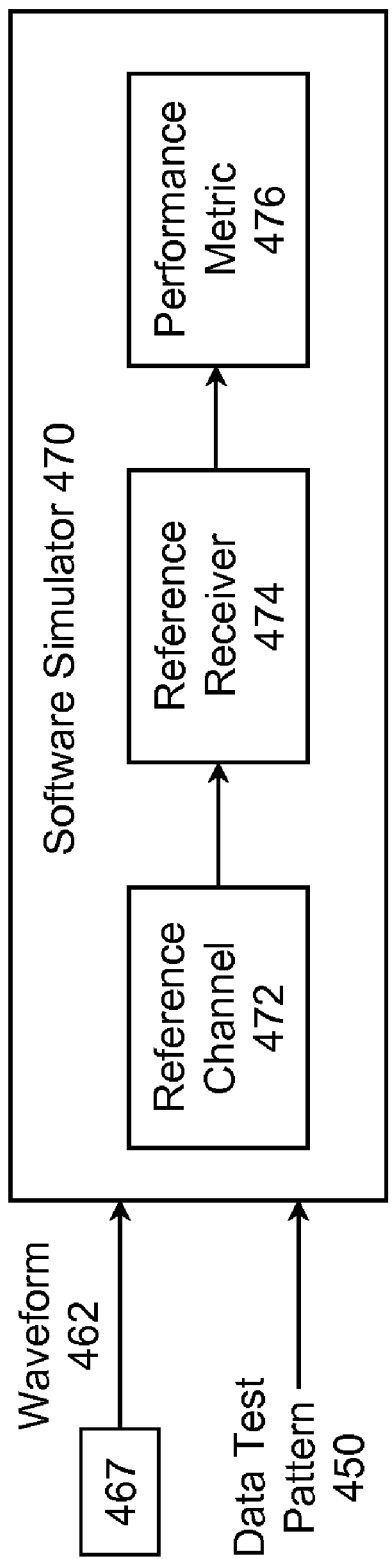

FIGS. 3 and 4 are block diagrams of a test system according to the current invention. The purpose of the test system is to test the transmitter, for example for compliance with a specific standard. In FIG. 3, a data test pattern 450 is applied to the transmitter under test 405. The transmitter 405 produces an output 460, which is captured by a waveform capture device 465, for example a sampling oscilloscope. The captured waveform may be stored in some medium 467, for subsequent retrieval.

In FIG. 4, a software simulator 470 accesses the stored waveform 462. The simulator 470 is designed to simulate the effects of a reference channel 472 and/or reference receiver 474. The software 470 processes the waveform 462 to simulate propagation of the waveform through the reference channel 472 and/or the reference receiver 474. A performance metric 476 is calculated based on the simulated propagation.

The data test pattern 450 may be used as an input to the software simulator 470, for example in modeling the reference receiver/channel or in calculating the performance metric. By using this software simulator-based approach, the performance of the transmitter under test 405 can be predicted without requiring the use of hardware reference components.

Described below is a specific embodiment using the 10 GBASE-LRM system as a specific example. The following example describes a test methodology for measuring a performance metric known as the Transmitter Waveform and Dispersion Penalty (TWDP). TWDP is defined as $$\text{TWDP}=\text{SNR}_{REF}-\text{SNR}_{TX}(\text{dBo}) \qquad (1)$$

where $\text{SNR}_{REF}$ is a reference signal to noise ratio (SNR), expressed in optical dB (dBo), and $\text{SNR}_{TX}$ is the equivalent SNR in dBo for the transmitter under test at the slicer input of a reference decision feedback equalizer (DFE) receiver for the measured waveform after propagation through a reference optical fiber channel. The transmitter under test is compliant with the standard if its computed TWDP is less than the upper limit specified by the IEEE 802.3aq standard.

In this test, the reference SNR, $\text{SNR}_{REF}$, has a specific numeric value, and it is related to $\text{OMA}_{RCV}$, T, and $N_0$ through $$\text{SNR}_{REF}=\text{OMA}_{RCV}\sqrt{T/(2N_0)}$$

$$\text{SNR}_{REF}(\text{dBo})=10\log_{10}(\text{OMA}_{RCV}\sqrt{T/(2N_0)}) \qquad (2)$$

where $\text{OMA}_{RCV}$ is the OMA of the signal at the input to the reference channel, $N_0$ is the one-sided power spectral density of the additive white Gaussian noise (AWGN) assumed for the reference DFE receiver, and T is the bit duration, also called the unit interval.

Eqn. (2) gives the SNR that would be realized by an ideal matched filter receiver if the received waveform were an ideal rectangular NRZ waveform with amplitude $\text{OMA}_{RCV}$ and the receiver had AWGN of spectral density $N_0$. This ideal received waveform would result, for example, if an ideal NRZ transmitter transmitted an optical signal of amplitude $\text{OMA}_{RCV}$ over a distortion-free, lossless optical fiber.

The specific value of $\text{SNR}_{REF}$ is set equal to some margin in optical dB above $\text{SNR}_{RQD}$, where $\text{SNR}_{RQD}$ is the SNR required for the ideal matched filter receiver to achieve a desired bit error rate (BER) for an ideal NRZ received waveform. For the 10 GBASE-LRM example, the desired BER is $10^{-12}$, and $\text{SNR}_{REF}$ is set 6.5 dBo above $\text{SNR}_{RQD}$ to allow for 6.5 dB of optical power penalties related to dispersion. The BER for a such a matched filter receiver with an ideal NRZ input waveform is given by $$\text{BER}=Q(\text{SNR}_{RQD}) \qquad (3)$$

where Q( ) is the Gaussian error probability function $$Q(y) = \int_{y}^{\infty} \frac{1}{\sqrt{2\pi}} e^{-\frac{x^2}{2}} dx \qquad (4)$$

For the 10 GBASE-LRM example, Eqns. (3) and (4) result in $10\log_{10}(\text{SNR}_{RQD})$ equal to 8.47 dBo to achieve a BER of $10^{-12}$. Allowing for 6.5 dB of optical power penalties related to dispersion results in an $\text{SNR}_{REF}$ given by $$\text{SNR}_{REF}=8.47+6.5=14.97 \text{ dBo} \qquad (5)$$

For a given $\text{OMA}_{RCV}$, $\text{SNR}_{REF}$ determines a particular $N_0$ through Eqn. (2). Without loss of generality, $\text{OMA}_{RCV}$ is normalized to 1, and $N_0$ is set accordingly.

Figure 5:
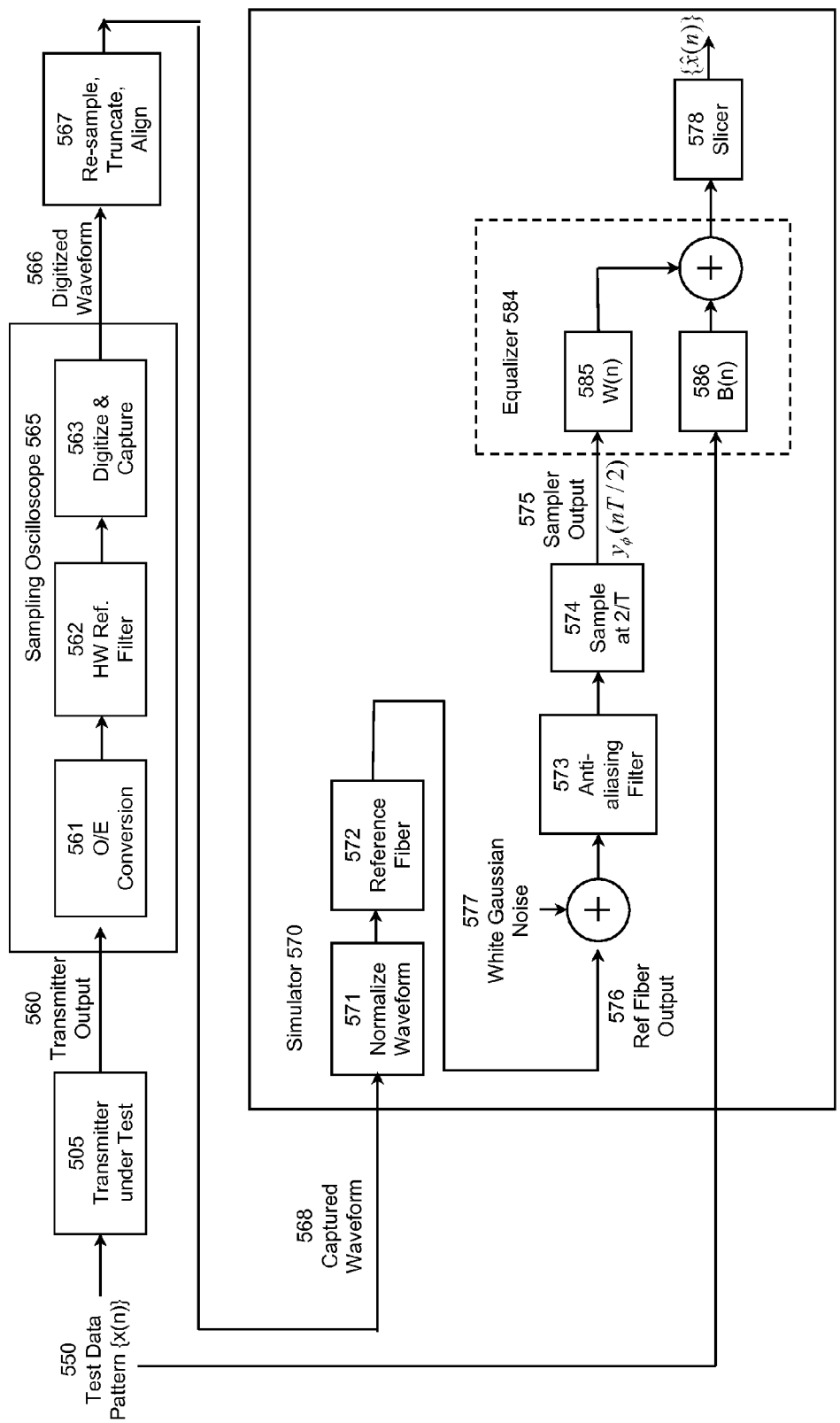
FIG. 5 is a block diagram of a model of a test system according to the invention.

Turning now to the transmitter under test, in a preferred embodiment, the $\text{SNR}_{TX}$ (and hence, also the TWDP) is calculated by MATLAB code as illustrated in FIG. 5. The data test pattern {x(n)} 550 driving the transmitter under test 505 is a periodic PRBS9 or similar data pattern. The transmitter 505 outputs an optical waveform 560, which is converted to an electrical signal by an optoelectronic converter 561, filtered by a hardware reference filter 562, and then digitized and captured 563. In one embodiment, the optoelectronic conversion, hardware filtering, and digitization and capture are all performed by a sampling oscilloscope 565 with an appropriate optical head, though the functions may alternatively be performed by separate devices. The oscilloscope is set to capture at least one complete cycle of the periodic signal 560 with at least seven samples per unit interval. The number of samples per unit interval is not critical as long as the sampling rate is high enough to capture the high frequency content of the signal out of the hardware filter 562 without aliasing. In a preferred embodiment, the hardware filter 562 has a fourth-order Bessel-Thomson response with 3 dB electrical bandwidth of 7.5 GHz to filter the incoming waveform before digitization. The oscilloscope is set to average out noise in the waveform, thus producing the digitized waveform 566 which approximates a noiseless filtered version of the transmitter output 560. In an alternate embodiment, no hardware filter 562 is used. However, this alternate embodiment may lead to variation in measurement from one test setup to another depending of the inherent bandwidth of the optoelectronic conversion and subsequent digitization.

The inputs to the software simulator 570 include the following:
   The captured waveform 568, which, in this specific example, is one complete cycle of the digitized waveform 566 with an integer number of samples per bit period or unit interval—e.g., one complete cycle of the waveform resulting from a periodic PRBS9 data test pattern. In some cases, the digitized waveform 566 is pre-processed (e.g., re-sampled, truncated and/or aligned with the data test pattern, as necessary) to produce the captured waveform 568. In other cases, pre-processing may not be necessary and the digitized waveform 566 can be used directly as the captured waveform 568. In a preferred embodiment, the captured waveform 568 has 16 samples per unit interval. The number of samples per unit interval is not critical as long as the sampling rate is high enough to represent the high frequency content of the signal without aliasing.
   One complete cycle of the data test pattern 550 used to generate the captured waveform 568. The data test pattern 550 and the captured waveform 568 are aligned (i.e., a rectangular pulse train based on the data test pattern 550 is aligned with the captured waveform 568 within one unit interval). The data test pattern 550 has period N (e.g., 511 for PRBS9) and one cycle is denoted {x(n)}, where $0 \le n \le N-1$.

The preprocessing steps of re-sampling, truncation to one complete cycle, and alignment with the data test pattern are shown performed in block 567 outside the simulator 570 and outside the sampling oscilloscope 565. Alternatively, some or all of these steps may be performed as part of the simulator 570, or inside the sampling oscilloscope 565, or as part of the digitization and capture 563.

In a preferred embodiment, the captured waveform 568 is processed by the software simulator 570, as follows:
   1. The captured waveform 568 is normalized 571. The OMA and baseline (steady state zero level) of the waveform 568 are either measured separately and entered as inputs to the algorithm, or alternatively they are estimated from the captured waveform, as described more fully below. The zero-level (baseline) is subtracted from the waveform 568 and the waveform is scaled such that the resulting OMA is 1. Thus, the normalized waveform has a baseline of 0 and an OMA of 1. $N_0$ is set such that $SNR_{REF}$ is 14.97 dBo, as described above.

2. Propagation of the normalized waveform through an optical fiber reference channel 572 is simulated. In a preferred embodiment, the reference channel is represented by an impulse response. An alternative embodiment can represent the reference channel by a frequency response, or by a lookup table, or by other mappings of input waveform to output waveform. In a preferred embodiment, propagation is accomplished in the frequency domain. This is accomplished by performing Fourier transforms on the normalized waveform and fiber impulse response, multiplying the transforms together, and then performing an inverse Fourier transform back to the time domain. An alternative embodiment accomplishes propagation in the time domain by convolving the normalized waveform with the fiber impulse response.

Note that the OMA can alternatively be normalized after propagation through the fiber, depending on the performance metric desired. As long as the fiber model is normalized to preserve OMA, normalizing before or after propagation will give equivalent results.

3. The output from the reference channel 572 is passed through an antialiasing filter 573. A fourth-order Butterworth filter of bandwidth 7.5 GHz is used in this example. An alternative embodiment would omit the antialiasing filter 573 but would instead filter the white Gaussian noise 577 before adding it to the reference fiber output 576.

4. The output signal from the antialiasing filter 573 is sampled 574 at rate 2/T with sampling phase φ. An alternate embodiment using a matched filter and a rate 1/T sampler is described below. The sampler output 575 is denoted $y_\phi(nT/2)$, which has a deterministic component and a random component given by $$y_\phi(nT/2) = r(n) + \eta(n).$$

The sequence {r(n)} is the deterministic sampled version of the filtered output of the reference fiber; it is periodic with period 2N. The sequence {η(n)} is a discrete-time noise sequence which is obtained by passing the AWGN through the anti-aliasing filter and sampling.

Figure 6:
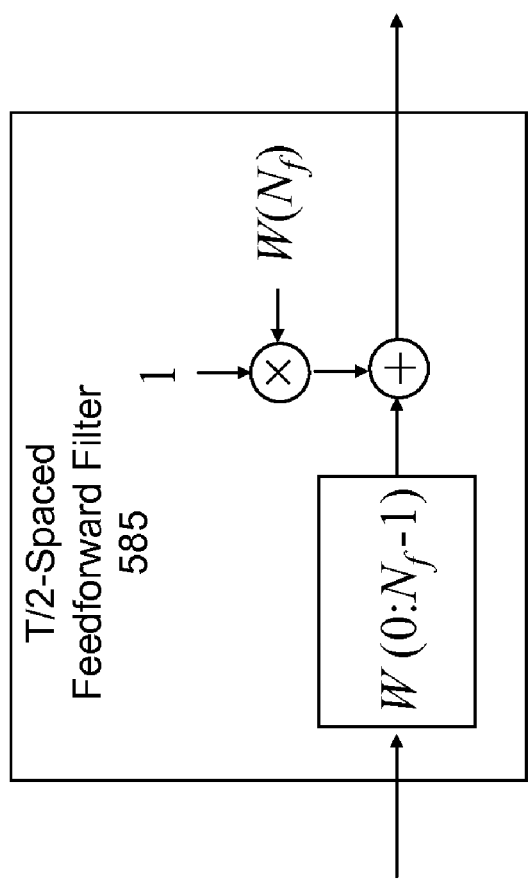
FIG. 6 is block diagram of a feedforward filter with a tap to adjust a constant offset.

5. The sampled signal is processed by a fractionally-spaced MMSE-DFE receiver 584 with $N_f$ feedforward taps (at T/2 spacing) 585 and $N_b$ feedback taps 586. For example, $N_f$ can be set to 14 and $N_b$ can be set to 5. The use of 14 feedforward taps and 5 feedback taps are example settings; the number of taps can be different depending on the desired capabilities of the reference DFE receiver. The feedforward filter is optionally augmented with an extra $(N_f+1^{th})$ tap that adjusts to optimize a constant offset, as shown in FIG. 6 and described more fully below. The feedforward and feedback tap coefficients are calculated using a least-squares approach that minimizes the mean-squared error at the slicer 578 input for the given captured waveform, assuming the noise power spectral density $N_0$ set according to Eqn. (2) as described above.

FIG. 5 shows the channel and equalizer model used for the least-squares calculation. The reference DFE consists of a feedforward filter {W(0), . . . , W($N_f$−1)}, an optional constant offset coefficient W($N_f$) (as shown in FIG. 6), and a feedback filter {B(1), . . . , B($N_b$)}. A conventional DFE would feedback decisions {x̂(n)}. In this case, the decisions are assumed to be correct and the decided bits are therefore replaced with the transmitted bits {x(n)}. While a finite length equalizer is shown in this example, an alternate embodiment would include an infinite length equalizer, performance of which could be computed analytically.

The feedback filter 586 is symbol spaced and strictly causal, feeding back the $N_b$ bits prior to the current bit x(n). The input sequence on which the slicer makes decisions is denoted {z(n)}, where $$z(n) = \sum_{k=0}^{N_f-1} W(k)y_\phi(nT+DT-kT/2) + W(N_f) - \sum_{k=1}^{N_b} B(k)x(n-k)$$
$$= \sum_{k=0}^{N_f-1} W(k)(r(2n+2D-k) + \eta(2n+2D-k)) + W(N_f) - \sum_{k=1}^{N_b} B(k)x(n-k) \qquad (6)$$

Eqn. (6) includes the term W($N_f$), which is the optional constant offset coefficient for automated offset compensation; without offset compensation, W($N_f$) would be absent (or set to 0). In Eqn. (6), D is an integer such that the number of anticausal T/2-spaced taps in the feedforward filter is 2D. While the feedforward filter is modeled as having anticausal taps, a practical equalizer would delay decisions by DT so that the overall system is causal. DT is referred to as the equalizer delay. Sometimes the equalizer delay is expressed as the number of feedforward anticausal taps, 2D.

The least-squares solution for the feedforward and feedback filters minimizes the quantity $$MSE = E\left[\sum_{n=0}^{N-1}(z(n)-x(n))^2\right]$$

where the expectation operator, E, refers to the random noise at the slicer input, which results from the additive white Gaussian noise 577, filtered through the antialiasing filter 573, sampled 574, and filtered by the feedforward filter 585. (Here MSE is actually N times the mean-squared error when averaged over the input sequence {x(n)}.) The algorithm finds the optimal W vector, B vector, and equalizer delay DT such that the mean-squared error is minimized in an efficient manner, for example as described in P. A. Voois, I. Lee, and J. M. Cioffi, "The effect of decision delay in finite-length decision feedback equalization," *IEEE Transactions on Information Theory*, vol. 53, pp. 618-621, March 1996, which is incorporated herein by reference. The optimal sampling phase φ for the T/2 sampler is found by a brute-force search over the 16 sampling phases in the unit interval. Note that for a sufficiently long equalizer, that is, for $N_f$ and $N_b$ sufficiently large, the MSE is insensitive to sampling phase and equalizer delay. In that case, the number of anticausal taps 2D can be set to $N_f/2$, for example, and optimization over D and φ can be omitted. Further details of the mean squared error (MSE) minimization are given below.

6. Once the MSE is minimized by finding the optimal sampling phase, equalizer delay, and tap coefficients, the bit-error rate is calculated by the semi-analytic method. In an actual receiver, the slicer would make binary decisions on its input based on whether the input is greater than or less than the slicer threshold. The probability of making an error depends on the amplitude of the input signal, the statistics of the input noise, and the threshold of the slicer, which for this example is set to ½. The overall bit-error rate is calculated as follows:

a. The Gaussian noise variance at the input to the slicer 578 is calculated.

b. For each bit in the data test pattern, the equalized input signal to the slicer 578 is calculated and the probability of error calculated based on the amplitude of the input signal, the variance of the input noise, and the threshold value.

c. The probabilities of error are averaged over all bits in the data test pattern to compute a total probability of error $BER_{TX}$.

7. The equivalent SNR in optical dB is derived from the $BER_{TX}$ according to $$SNR_{TX} = 10 \log_{10}(Q^{-1}(BER_{TX}))(dBo) \quad (7)$$

8. The TWDP for the simulated fiber reference channel 572 is equal to the difference (in optical dB) between $SNR_{REF}$ and the equivalent $SNR_{TX}$, as shown in Eqn. (1) above.

There are additional alternate embodiments that are related to the example algorithm described above. For example, the algorithm described above minimizes MSE at the slicer input, since that is how most practical equalizers are implemented. Alternatively, the reference receiver could minimize bit error rate (BER) or some other performance metric to compute the transmitter penalty. Minimization of BER would not necessarily result in the same penalty as that computed by minimizing mean squared error.

As another example, the TWDP algorithm described above simulates propagation through a single optical fiber reference channel. Alternatively, a number of optical fiber reference channels 572 may be simulated, each corresponding to a defined stressor that has been defined to represent a certain level of dispersion and a certain category of fiber response. The normalized waveform is passed though each of these simulated reference channels 572 and the reference equalizing receiver to compute a "channel-specific" TWDP for each channel. Transmitter compliance can be defined in terms of the collection of channel-specific TWDP values. For example, compliance can require that a certain percentage of the channel-specific TWDP values be below some threshold. In particular, one could require that all of the channel-specific TWDP values be below some limit. This is equivalent to requiring that the maximum of the channel-specific TWDP values be below some limit. Or, a different limit could be defined for different reference channels or classes of reference channels. It will be readily apparent that many different compliance criteria can be defined, all of which should be considered within the scope of this invention.

Appendices A and B give examples of MATLAB code that illustrate various aspects of the algorithm described above. The following derivation details relate the above description to the code presented in the appendices.

As described above, the TWDP algorithm requires estimates of the optical modulation amplitude (OMA) and baseline (steady state zero level) of the waveform to normalize 571 the waveform. These values can be measured externally and input into the algorithm, which saves computation time, or the algorithm can estimate these quantities based on the input waveform. However, for distorted waveforms, such as those that might result from the use of lower cost optical transmitters, these values can be difficult to measure accurately using the traditional method of displaying a waveform on an oscilloscope. It is therefore advantageous for the algorithm to automatically compute estimates of the OMA and baseline from the input waveform 568 rather than relying on externally provided measurements.

One method of computing OMA and baseline, referred to as Method 1, is as follows. In an optical communications system, the optical power output by a laser is commonly modulated in a binary fashion to send data over an optical fiber. Nominally, the optical power is high for the duration of a bit period to send a logical "1", and low to send a logical "0". The difference in optical power between the nominal high level and the nominal low level is the OMA, and we refer to the nominal low level as the baseline (or sometimes, the steady-state zero level, or simply the zero level). This type of modulation is commonly referred to as on-off-keying, where "on" means high laser power and "off" means low laser power. This is also referred to as nonreturn-to-zero (NRZ) signaling when the output power stays at nominally the same level for an entire bit period. In actuality, the level is not constant for the entire bit period due to finite rise and fall times of the laser output. Also, the laser output experiences ringing when it transitions from high power to low power and from low power to high power. This ringing is referred to as relaxation oscillation. Nonetheless, a common feature of NRZ modulation is that a long string of zeros or a long string of ones will each result in a modulated output signal that tends to a constant steady state value.

A simple linear (strictly, affine) model of the laser output power y(t) is given by $$y_{lin}(t) = b + OMA \sum_{n=-\infty}^{\infty} x(n) p(t - nT) \quad (8)$$

where b is a constant baseline value, $x_n \in \{0,1\}$, p(t) is the pulse shape output by the laser, and T is the bit period. OMA can be defined as the difference between the steady state "on" or "high" power of the laser and the steady state "off" or "low" power of the laser. For this definition of OMA to be consistent with Eqn. (8), a train of pulses p(t) must sum to 1, or $$\sum_{n=-\infty}^{\infty} p(t - nT) = 1 \quad (9)$$

If p(t) is the rectangular function $\Pi_T(t)$, defined by $$\Pi_T(t) = \begin{cases} 1 & |t| < T/2 \\ 1/2 & |t| = T/2 \\ 0 & |t| > T/2 \end{cases} \quad (10)$$

then $y_{lin}(t)$ is ideal NRZ modulation.

A generalized NRZ modulation can be defined by allowing p(t) to be a filtered version of the rectangular pulse shape. Let h(t) be the impulse response of a filter normalized such that $$\int_{-\infty}^{\infty} h(t) dt = 1 \quad (11)$$

Let $p(t)=\Pi_T(t)*h(t)$, where * denotes convolution. Then Eqn. (9) still holds, as can be seen by $$\sum_n p(t-nT) = h(t) * \sum_n \Pi_T(t-nT) \quad (12)$$
$$= h(t) * 1$$
$$= \int_{-\infty}^{\infty} h(t)\,dt$$
$$= 1$$

Also, $$\int_{-\infty}^{\infty} p(t)\,dt = \int_{-\infty}^{\infty} h(t)\,dt \int_{-\infty}^{\infty} \Pi_T(t)\,dt = T.$$

This is easily shown in the frequency domain.

Let $q(t)=OMA\, p(t)$. Then Eqn. (8) is rewritten as $$y_{lin}(t) = b + \sum_{n=-\infty}^{\infty} x(n)q(t-nT) \quad (13)$$

Now $$\int_{-\infty}^{\infty} q(t)\,dt = OMA \cdot T \quad (14)$$

Hence, Eqn. (14) can be used to estimate OMA by finding $q(t)$, integrating, and dividing by T. The pulse $q(t)$ is referred to as the estimated pulse response of the transmitter or channel.

The problem of estimating OMA can now be cast as finding the b and $q(t)$ in Eqn. (13) such that $y_{lin}(t)$ approximates $y(t)$. This problem is solved by finding the least-squares estimate that minimizes the mean squared error between $y(t)$ and $y_{lin}(t)$. This solution can be approximated by transitioning to the discrete time domain and using linear algebra techniques.

Let $t=mT+k\Delta$, where $0 \leq k \leq K-1$ and $\Delta=T/K$. Eqn. (13) can be generalized slightly by allowing b to be a periodic function of t with period T. From Eqn. (13), $$y_{lin}(mT+k\Delta) = b(k\Delta) + \sum_{n=-\infty}^{\infty} x(n)q((m-n)T+k\Delta) \quad (15)$$
$$= b(k\Delta) + \sum_{n=-\infty}^{\infty} x(m-n)q(nT+k\Delta)$$

Assume that the pulse response is of finite duration such that $q(t)=0$ for t outside the interval $[-AT,(M+1)T)$. Here A is the anticipation and M is the memory of the channel in bit periods.

Let $y'_m \equiv [y(mT)\; y(mT+\Delta) \ldots y(mT+(K-1)\Delta)]$, with similar definitions for $q_m$ and $y_{lin,m}$. The notation $v'$ denotes the transpose of v. Let $b' \equiv [b(0) \ldots b((k-1)\Delta)]$ and $x'_m \equiv [x(m+A) \ldots x(m) \ldots x(m-M)]$. Eqn. (15) can be compactly expressed for all K sampling phases by $$y_{lin,m} = b + q_{-A}x(m+A) + \ldots + q_M x(m-M) \quad (16)$$
$$= b + Qx_m$$

where Q is a K by A+M+1 matrix with columns $q_{-A}$ through $q_M$. Note that each column of Q consists of K successive samples of the continuous-time pulse response $q(t)$.

Now find the b and Q that minimize $E[|\epsilon|^2]$, where $$\epsilon \equiv y - y_{lin,m} \quad (17)$$

$|\epsilon|^2$ is the magnitude squared of the vector $\epsilon$, and $E[\square]$ indicates expected value. Treat x and y as random vectors and drop the m subscript. The orthogonality principle for least squares estimation implies that $$E[(y-(b+Q^*x))x']=0 \quad (18)$$

where $Q^*$ is the optimal Q for a given b. The least squares solution gives $$Q^* = \rho R_x^{-1} - bE[x']R_x^{-1} \quad (19)$$

where $$R_x \equiv E[xx'] \quad (20)$$

and $$\rho \equiv E[yx'] \quad (21)$$

Using Eqn. (19) in the expression for $E[|\epsilon^2|]$ and minimizing with respect to b gives the optimal $b^*$ as $$b^* = \frac{\bar{y} - \rho R_x^{-1} \bar{x}}{1 - \bar{x}' R_x^{-1} \bar{x}} \quad (22)$$

where an overbar indicates expected value. Substituting $b^*$ for b in Eqn. (19) gives the optimal Q for a periodic baseline that is allowed to vary with sampling phase. To find the optimal Q for a baseline that is constant, set $b'=b[1\;1\;\ldots\;1]$ for a scalar b. Using this b and $Q^*$ from Eqn. (19) in the expression for $E[|\epsilon^2|]$ and minimizing with respect to b leads to the optimal $b^*$ $$b^* = 1/K \sum_{i=1}^{K} b_i^* \quad (23)$$

where $b_i^*$ is the $i^{th}$ element of $b^*$. Using $b'=b^*[1\;1\;\ldots\;1]$ in Eqn. (19) gives the optimal Q for the constant baseline $b^*$.

Using whichever optimal $Q^*$ is preferred (constant baseline or periodic baseline), the samples of the continuous-time pulse response corresponding to this minimum mean squared error solution are given by $$q((-A+m)T+k\Delta) = Q^*_{k+1,m+1} \quad 0 \leq k \leq K-1;\; 0 \leq m \leq A+M \quad (24)$$

The integral in Eqn. (14) is approximated by $$\int_{-\infty}^{\infty} q(t)\,dt \approx \Delta \sum_{k=1}^{K} \sum_{m=1}^{A+M+1} Q^*_{k,m} \quad (25)$$

With T=KΔ, Eqns. (14) and (25) give $$OMA \approx \frac{1}{K}\sum_{k=1}^{K}\sum_{m=1}^{A+M+1} Q_{k,m}^* \quad (26)$$

It turns out that the estimate of OMA is identical whether the Q* based on constant baseline or periodic baseline is used in Eqn. (26). For the TWDP computation, the constant baseline is used as the estimated baseline.

The above results are now translated into MATLAB code to compute OMA for captured experimental data. Let $y_m$ be the captured samples as defined above, where each vector $y_m$ consists of K samples of a single bit period of the sampled waveform for a repetitive data test pattern of length N. Let $x_m$ also be defined as above, where $x_m$ is a vector consisting of A data bits preceding the "current" bit, the current bit x(m), and M data bits after the current bit. Form the matrices Y and X with columns $y_m$ and $x_m$, respectively, where m varies from 0 to N−1. With expectations taken over the N data vectors $x_m$, each assumed equally likely, the expected values required for the least squares fit and OMA estimation above are given by $$R_x = \frac{1}{N}XX' \quad (27)$$

$$\rho = \frac{1}{N}YX'$$

$$\bar{x} = X1/N$$

$$\bar{y} = Y1/N$$

where 1 is an all-ones column vector of length N.

Eqn. (16) can be written compactly for all N bit periods as $$Y_{lin} = [Q \; b] \begin{bmatrix} X \\ 1' \end{bmatrix} \quad (28)$$

The optimal Q* and b* can be found using a pseudo-inverse and the captured waveform matrix Y:

$$[Q^* \; b^*] = Y[X' \; 1] \left( \begin{bmatrix} X \\ 1' \end{bmatrix} [X' \; 1] \right)^{-1} \quad (29)$$

With some manipulation and making use of the relations in Eqn. (27), it can be shown that Eqn. (29) gives the same result as Eqn. (19) and Eqn. (22) for the periodic bias case. OMA and baseline can then be estimated using Eqns. (29), (23), and (26).

Eqns. (29), (23), and (26) are the basis of the following example MATLAB code, which can be used in the implementation of TWDP calculation to estimate OMA (MeasuredOMA in the code) and the baseline (SteadyZeroPower in the code) from the input waveform 568. The variables ant and mem are the anticipation and memory, respectively, in bit periods. These parameters can be varied to fit the memory span of the intersymbol interference of the input waveform. The accuracy of the OMA estimate is dependent on the choice of ant and mem. If ant and mem are set too low, the entire pulse response will not be contained within the span. On the other hand, if they are chosen very large, the $2^{A+M+1}$ possible binary vectors of length A+M+1 will be sparsely represented in the data test pattern if the sequence is of length significantly less than $2^{A+M+1}$. In that case, the expected values computed may be significantly different than the expectations taken over truly random data.

```
ant=4; mem=5;
X=zeros(ant+mem+1,PRBSlength);
Y=zeros(OverSampleRate,PRBSlength);
X(1,:)=[XmitData(1+ant:end)' XmitData(1:ant)'];
for ind=2:ant+mem+1
    X(ind,:)=[X(ind−1,end) X(ind−1,1:end−1)];
end
X=[X;ones(1,PRBSlength)];
for ind=1:OverSampleRate
    Y(ind,:)=yout0([0:PRBSlength−1]*OverSampleRate+ind)';
end
Qmat=Y*X'*(X*X')^(−1);
SteadyZeroPower=mean(Qmat(:,ant+mem+2));
Qmat=Qmat(:,1:ant+mem+1);
MeasuredOMA=sum(Qmat(:))/OverSampleRate;
```

Method 1 for OMA and baseline estimation used a definition of OMA as the difference between the steady state "on" or "high" power of the laser and the steady state "off" or "low" power of the laser. However, IEEE 802.3ae Clause 52.9.5 specifies a method of measuring OMA based on a transmitted square wave pattern that can result in an OMA measurement different from this definition. The reason is that the laser output may not reach its steady state "on" value or steady state "off" value during the half period of the square wave that the laser is respectively "on" or "off". The method described next, referred to as Method 2, results in an OMA value consistent with the measurement technique specified in IEEE 802.3ae Clause 52.9.5.

Like the method presented previously, Method 2 performs a linear fit that finds the pulse response of the modulation that gives the best fit to the captured waveform. Instead of integrating that pulse response to estimate the OMA, Method 2 uses that pulse response to synthesize what the optical waveform would have been if a square wave of the appropriate frequency had been transmitted. The amplitude of the optical signal at the center of the "on" or "high" portion of the square wave is then measured by averaging over the center 20% of the "on" portion, and the amplitude of the optical signal at the center of the "off" or "low" portion of the square wave is similarly measured. The OMA estimate is then the difference between the "on" amplitude and the "off" amplitude, and the baseline estimate is the measurement of the "off" amplitude.

IEEE 802.3ae Clause 52.9.1.2 specifies that the data test pattern for the square wave may be "a pattern consisting of four to eleven consecutive ones followed by an equal run of zeros". A preferred embodiment uses a square wave comprising a repetitive pattern with eight consecutive ones followed by eight consecutive zeros, though other period lengths (for example, ten ones and ten zeros) could be used instead. An example implementation of Method 2 for OMA and baseline estimation is included in the MATLAB code in Appendix B.

Automated offset optimization is now discussed in additional detail. While the offset optimization technique described here is presented in the context of a simulated reference receiver for a transmitter test, it can also be used in a real equalizing receiver to correct offset in the received waveform. In one embodiment, the TWDP algorithm corrects for inaccuracies in the estimated value of the baseline (or steady state zero level). This automated offset method makes the reported TWDP value independent of estimation error in the baseline. In fact, it obviates the need to measure a baseline at all provided the ratio of baseline value to OMA is not unreasonably large. After OMA normalization and subtraction of the estimated baseline, the resulting normalized waveform has target signal values of "0" and "1". The slicer threshold for BER determination is set at ½. An error in baseline estimation such that the resulting waveform is improperly offset and not centered about ½ will result in a higher BER than if the offset were optimized. This offset optimization can be alternatively viewed as a threshold optimization.

The automated offset optimization can be accomplished by extending the vector of feedforward equalizer tap coefficients by 1. The additional tap is not fed by a delayed version of the received signal, but is instead fed by the constant 1. FIG. 6 shows an example feedforward filter with $N_f$ regular taps and an extra $(N_f+1)^{th}$ tap for offset optimization. The MMSE tap coefficients are then calculated in the normal fashion, and the coefficient of the extra tap essentially gives the offset that minimizes mean squared error with the target signal values. An alternate method extends the length of the feedback tap coefficient vector by one, feeding that extra feedback tap by the constant 1, and computing the offset as part of the feedback tap coefficient vector.

Figure 7A:
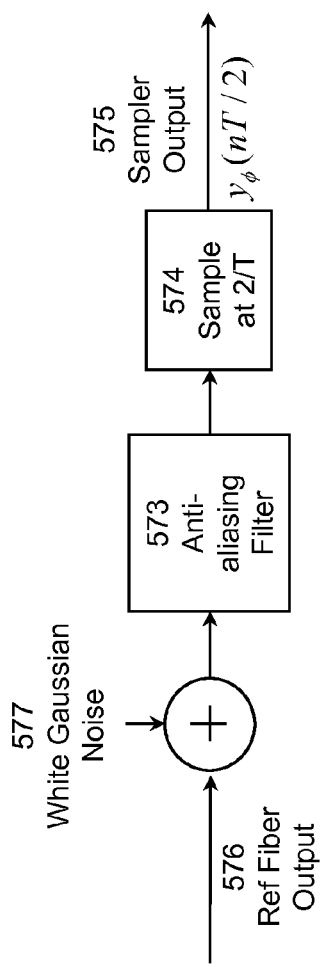
FIGS. 7A and 7B are block diagrams of mathematically equivalent models for the sampler output.
Figure 7B:
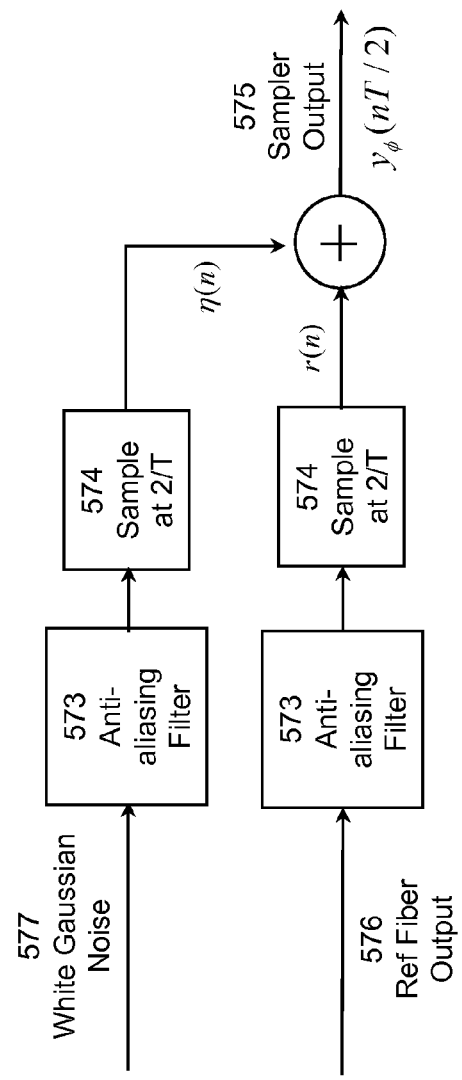

A derivation of the MSE minimization and offset optimization is now provided that relates the mathematical description above to the sample MATLAB code in Appendices A and B. FIGS. 7A and 7B show mathematically equivalent models for generating the sampler output sequence $y_\phi(nT/2)$. The anti-aliasing filters 573 are identical, as are the T/2 samplers 574 (identical sampling rate and phase). The model in FIG. 7B shows explicitly the random noise component $\eta(n)$ and the deterministic periodic component $r(n)$ that comprise the sampler output $y_\phi(nT/2)$. The actual values of the sequence $\{\eta(n)\}$ are not required for MSE minimization; only the second order statistics are required. This suggest an alternate embodiment where the noise sequence $\eta(n)$ is described only in terms of its second order statistics, and AWGN 577 is not necessarily assumed in the model.

Assume that the AWGN 577 is mean zero, in which case $\{\eta(n)\}$ is also mean zero. Denote the autocorrelation sequence for $\{\eta(n)\}$ by $\{c(k)\}$.

$$c(k) \equiv E[\eta(n)\eta(n-k)] = c(-k)$$

The derivation for the case without offset optimization ($W(N_f)=0$) is described first. From Eqn. (6), the slicer input for deciding bit n is $$z(n) = \sum_{k=0}^{N_f-1} W(k)(r(2n+2D-k)+\eta(2n+2D-k)) - \sum_{k=1}^{N_b} B(k)x(n-k) \quad (30)$$

This can be conveniently described in matrix notation for all values of n, $0 \leq n \leq N-1$, as $$z = (R+N)w - X\begin{bmatrix} 0 \\ b \end{bmatrix} \quad (31)$$

where $$z \equiv \begin{bmatrix} z(0) \\ z(1) \\ \vdots \\ z(N-1) \end{bmatrix}; \quad (32a)$$

$$w \equiv \begin{bmatrix} W(0) \\ W(1) \\ \vdots \\ W(N_f-1) \end{bmatrix};$$

$$b \equiv \begin{bmatrix} B(1) \\ B(2) \\ \vdots \\ B(N_b) \end{bmatrix}$$

$$R \equiv \begin{bmatrix} r(2D) & r(2D-1) & \ldots & r(2D-N_f+1) \\ r(2D+2) & r(2D+1) & \ldots & r(2D-N_f+3) \\ \vdots & \vdots & & \vdots \\ r\binom{2D+}{2(N-1)} & r\binom{2D+}{2N-3} & \ldots & r\binom{2D+2(N-1)-}{N_f+1} \end{bmatrix} \quad (32b)$$

$$N \equiv \begin{bmatrix} \eta(2D) & \eta(2D-1) & \ldots & \eta(2D-N_f+1) \\ \eta(2D+2) & \eta(2D+1) & \ldots & \eta(2D-N_f+3) \\ \vdots & \vdots & & \vdots \\ \eta\binom{2D+}{2(N-1)} & \eta\binom{2D+}{2N-3} & \ldots & \eta\binom{2D+2(N-1)-}{N_f+1} \end{bmatrix} \quad (32c)$$

$$X \equiv \begin{bmatrix} x(0) & x(-1) & \ldots & x(-N_b) \\ x(1) & x(0) & \ldots & x(-N_b+1) \\ \vdots & \vdots & & \vdots \\ x(N-1) & x(N-2) & \ldots & x(N-N_b-1) \end{bmatrix} \quad (32d)$$

For a given equalizer delay DT and sampling phase $\phi$, minimizing MSE requires finding the vectors w and b that minimize the quantity $$\text{MSE} = E[|z-x|^2] \quad (33)$$

where $|\square|^2$ indicates the squared magnitude of the vector argument. Here x is the vector of N bits in the periodic sequence $\{x(n)\}$ $$x \equiv \begin{bmatrix} x(0) \\ x(1) \\ \vdots \\ x(N-1) \end{bmatrix} \quad (34)$$

Using the fact that E[N] is the all-zeroes matrix, it follows that $$E[|z-x|^2] = w'(R'R+C_\eta)w - 2w'R'X\tilde{b} + \tilde{b}'X'X\tilde{b} \quad (35)$$

where v' indicates the transpose of the vector or matrix v, and $$C_\eta \equiv E[N'N] = N\begin{bmatrix} c(0) & c(1) & \ldots & c(N_f-1) \\ c(1) & c(0) & \ldots & c(N_f-2) \\ \vdots & \vdots & & \vdots \\ c(N_f-1) & c(N_f-2) & \ldots & c(0) \end{bmatrix} \quad (36)$$

Minimizing the MSE in Eqn. (35) with respect to w for a given $\tilde{b}$ gives $$w_{opt}(\tilde{b}) = (R'R+C_\eta)^{-1} R'X\tilde{b} \quad (37)$$

Note that this result gives the optimal weight vector for a feedforward only equalizer by setting $N_b=0$. In that case $\tilde{b}=1$ and $X=x$. This can be used in an alternate embodiment that uses a linear (feedforward only) equalizer instead of a DFE in the reference receiver.

Substituting the expression for $w_{opt}(\tilde{b})$ for w in Eqn. (35) gives $$E[|z - x|^2] = \tilde{b}' \tilde{P} \tilde{b} \qquad (38)$$

$$= \begin{bmatrix} 1 & b' \end{bmatrix} \begin{bmatrix} P_{00} & p' \\ p & P \end{bmatrix} \begin{bmatrix} 1 \\ b \end{bmatrix}$$

$$P_{00} + 2p'b + b'Pb$$

where $$\tilde{P} = X'X - X'R(R'R + C_\eta)^{-1} R'X \qquad (39)$$

Minimizing the resulting expression for MSE with respect to b gives $$b_{MMSE} = -P^{-1} p \qquad (40)$$

Collecting the results for the final answer, the minimizing feedback vector b is $$b_{MMSE} = -P^{-1} p \qquad (41a)$$

where P is the square matrix in the lower right corner of $\tilde{P}$ that excludes the first column and first row of $\tilde{P}$, p is the first column of $\tilde{P}$ excluding the top element $P_{00}$, and $\tilde{P}$ is given by $$\tilde{P} = X'X - X'R(R'R + C_\eta)^{-1} R'X \qquad (41b)$$

The minimizing feedforward vector w is given by $$w_{MMSE} = (R'R + C_\eta)^{-1} R' X \begin{bmatrix} 1 \\ b_{MMSE} \end{bmatrix} \qquad (41c)$$

The minimum MSE is given by $$MMSE = P_{00} + 2p' b_{MMSE} + b'_{MMSE} P b_{MMSE} \qquad (41d)$$

$$= P_{00} - p' P^{-1} p$$

The variance of the Gaussian noise at the input to the slicer, used to compute the BER semianalytically, is given by $$\sigma^2 = \frac{1}{N} w' C_\eta w \qquad (42)$$

Including the extra feedforward tap for automatic offset optimization requires a modification to the derivation above. Augment the feedforward vector w with an extra tap to give the new feedforward vector $\tilde{w}$ $$\tilde{w} = \begin{bmatrix} w \\ w(N_f) \end{bmatrix} \qquad (43)$$

Augment the matrix of noiseless channel outputs R with an additional column of all ones, denoted as the column vector 1, to give the new matrix $$\tilde{R} = [R\ 1] \qquad (44)$$

Augment the matrix of noise samples N with an additional column of all zeros, denoted as the column vector 0, to give the new matrix $$\tilde{N} = [N\ 0] \qquad (45)$$

Then $$\tilde{C}_\eta \equiv E[\tilde{N}'\tilde{N}] = \begin{bmatrix} C_\eta & 0 \\ 0' & 0 \end{bmatrix} \qquad (46)$$

The solution for the case with automated offset optimization is obtained by replacing w with $\tilde{w}$, R with $\tilde{R}$, and $C_\eta$ with $\tilde{C}_\eta$ in Eqns. (41) and 42). Note that $$(\tilde{R}'\tilde{R} + \tilde{C}_\eta)^{-1} = \begin{bmatrix} R'R + C_\eta & R'1 \\ 1'R & N \end{bmatrix}^{-1}; \qquad (47)$$

$$\tilde{w}' \tilde{C}_\eta \tilde{w} = w' C_\eta w$$

which are used in the example MATLAB code in the appendices.

The alternate embodiment mentioned above that extends the feedback filter instead of the feedforward filter can be implemented, for example, by extending the vector b by one element and appending a column of all ones to the matrix X in Eqns. (41a) through (41d).

Appendix A includes sample MATLAB code that computes TWDP for a reference DFE receiver with 100 T/2-spaced feedforward taps, 50 feedback taps, and automated offset optimization. The OMA and baseline of the signal are entered manually instead of estimated automatically. The equalizer delay is 50 feedforward taps (25 T), and the equalizer is long enough that optimization over equalizer delay and sampling phase are not required.

In the embodiment illustrated in Appendix A, the reference receiver 584 uses a very long equalizer, closely approximating performance of an ideal infinite length equalizer. The use of 100 feedforward taps 585 (at T/2 spacing), 50 feedback taps 586 (at T spacing), and an equalizer delay of 50 feedforward taps (25 T) are representative values that approximate an infinite length equalizer for the optical fiber channels of interest. Because the longer T/2 spaced feedforward equalizer is insensitive to sample phase and exact value of equalizer delay, this embodiment has the advantage that it does not require optimization over these parameters. However, such a long equalizer may give overly optimistic results for certain channels and thus may not accurately reflect the equalizability of the waveform by a practical receiver that uses a conventional DFE architecture. For example, because of the use of pseudo-random sequences, certain non-linear distortions will appear as delayed copies of the sequence added to the signal. If the delayed copy falls within the span of the very long equalizer, the reference DFE will appear to correct this distortion. With truly random data (instead of a PRBS), the nonlinear distortion would not be equalizable by a classic DFE. Since the delayed copy is more likely to fall outside the span of a shorter equalizer, use of the shorter equalizer in the reference receiver 584 is more likely to give a realistic indication of the equalizability of the signal in real receivers. Another example where the very long equalizer might give overly optimistic performance predictions is when distortions in the transmitted waveform include electrical reflections that are delayed so much that they fall outside the span of a practical length equalizer but are effectively equalized by the extremely long equalizer.

For these reasons, it is sometimes desirable to implement a much shorter DFE in the reference receiver, for example, an equalizer with 14 feedforward taps and 5 feedback taps. The embodiment with a short equalizer requires optimization of sampling phase and equalizer delay. This could be accomplished by setting the delay and phase to given values, minimizing MSE over w and b as described above, and then repeating the process in a brute force manner until the optimum settings for equalizer delay and sampling phase are found. However, it is sometimes possible to save computing time by performing an efficient optimization over equalizer delay, depending on the equalizer length and the search range for equalizer delay. One such method for efficient optimization of equalizer delay is described in P. A. Voois, I. Lee, and J. M. Cioffi, "The effect of decision delay in finite-length decision feedback equalization," *IEEE Transactions on Information Theory*, vol. 53, pp. 618-621, March 1996. This method is illustrated in the sample MATLAB code in Appendix B.

In another alternative embodiment of the TWDP calculation, the receiver has a matched filter, matched to the shape of the received pulse, which allows the use of a T-spaced feedforward filter instead of a T/2-spaced filter. For this alternative, the simulation algorithm estimates a channel pulse response based on the reference fiber output 576. The linear fit described above as Method 1 for OMA and baseline estimation can be used, for example, to estimate the pulse response. The front end of the reference receiver then uses a matched filter matched to this pulse response. This matched filter replaces the antialiasing filter 573. The signal is passed through the matched filter and is sampled at integer multiples of T instead of T/2. However, this embodiment has the disadvantage that the estimated pulse response may inaccurately model the true pulse shape due to nonlinearities in the transmitter and/or channel. This may result in suboptimal equalization and could underestimate the link performance with a real receiver based on a fractionally spaced equalizer.

Although the detailed description contains many specifics, these should not be construed as limiting the scope of the invention but merely as illustrating different examples and aspects of the invention. It should be appreciated that the scope of the invention includes other embodiments not discussed in detail above. For example, a T-spaced equalizer without a matched filter could be used instead of a T/2-spaced equalizer if it is known that the simulated waveform entering the reference receiver will always have bandwidth less than 1/(2T). As further examples, the specific number of taps used for feedforward and feedback, and the anticipation and memory used in the linear fits should be considered exemplary and not in any way limiting the scope of the invention. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

APPENDIX A

Sample MATLAB Code, Example 1

This MATLAB code illustrates various aspects of the invention. This version implements a very long DFE that does not require optimization of equalizer delay or sampling phase. It includes code for automatic offset optimization and requires external input of the OMA and steady-state zero level.

```
%%%%%%%% MATLAB (R) script to compute TWDP %%%%%%%%%%%%%%%%%%%%%%%%%%
%
%*** Includes modification to automatically compute optimal offset making
%*** errors in SteadyZeroPower irrelevant.
%% TWDP test inputs
%% Units for all optical power values must match. The
%% values given below for TxDataFile, MeasuredWaveformFile, MeasuredOMA,
%% and SteadyZeroPower are examples and should be replaced by actual
%% path\filenames and values for each waveform tested.
%% Transmit data file:
%% The transmit data sequence is one of the TWDP test patterns.
%% The file format is ASCII with a single column of
%% chronological ones and zeros with no headers or footers.
TxDataFile = 'prbs9_950.txt';
%% Measured waveform. The waveform consists of exactly K samples per unit
%% interval T, where K is the oversampling rate. The waveform must be
%% circularly shifted to align with the data sequence. The file format for
%% the measured waveform is ASCII with a single column of chronological
%% numerical samples, in optical power, with no headers or footers.
MeasuredWaveformFile = 'preproc-1207-01.txt';
%% OMA and steady-state ZERO power must be entered.
MeasuredOMA = 6.6e-4; % Measured OMA, in optical power
SteadyZeroPower = 2.76e-4; % Measured steady-state logic ZERO
OverSampleRate = 16; % Oversampling rate
%% Simulated fiber response, modeled as a set of ideal delta functions with
%% specified amplitudes in optical power and delays in nanoseconds.
%% FiberResp contains delays in row 1, corresponding power coefficients in
%% the other three rows. Rows 2, 3, and 4 each correspond to a differenct
%% fiber channel model. For this example, use the power coefficients in
%% row 4. The vector 'Delays' contains the delays, and the vector 'PCoefs'
%% contains the amplitudes.
FiberResp = [...
    0.000000 0.072727 0.145455 0.218182
    0.158 0.176 0.499 0.167
    0.000 0.513 0.000 0.487
```

```
     0.254 0.453 0.155 0.138];
Delays = FiberResp(1,:)';
PCoefs = FiberResp(4,:)';
%% Program constants %%
SymbolPeriod = 1/10.3125; % Symbol period (ns)
EFilterBW = 7.5; % Antialiasing filter bandwidth (GHz)
%% For this example, use a very long equalizer, so optimization of
%% equalizer delay and sampling phase are not required. Set the equalizer
%% delay to half the length of the feedforward filter
EqNf = 100; % Number of feedforward filter taps
EqNb = 50; % Number of feedback filter taps
EqDel = ceil(EqNf/2); % Equalizer delay
PAlloc = 6.5; % Allocated dispersion penalty (dBo)
Q0 = 7.03; % BER = 10^(-12)
%% Load input waveforms
XmitData = load(TxDataFile);
yout0 = load(MeasuredWaveformFile);
PtrnLength = length(XmitData);
TotLen = PtrnLength*OverSampleRate;
Fgrid = [-TotLen/2:TotLen/2-1].'/(PtrnLength*SymbolPeriod);
%% STEP 1 - Normalize OMA%%%%%%%%%%%%%%%%%%%%%%%%%%%%%%%%%%%%%
yout0 = (yout0 - SteadyZeroPower)/MeasuredOMA;
% Alternatively, we could just use yout0 = yout0/MeasuredOMA, since the
% offset optimization below would correct for failing to subtract off the
% steady state zero level as long as SteadyZeroPower is not unreasonably
% large compared to MeasuredOMA
%% STEP 2 - Process waveform through simulated fiber channel. Fiber
%% frequency response is normalized to 1 at DC (sum(PCoefs)=1).
ExpArg = -j*2*pi*Fgrid;
Hsys = exp(ExpArg * Delays') * PCoefs;
Hx = fftshift (Hsys/sum(PCoefs));
yout = real(ifft(fft(yout0).*Hx));
%% STEP 3 - Process signal through front-end antialiasing filter
%% Compute frequency response of front-end Butterworth filter
[b,a] = butter(4, 2*pi*EFilterBW,'s');
H_r = freqs(b,a,2*pi*Fgrid);
%% Process signal through front-end filter
yout = real(ifft(fft(yout) .* fftshift(H_r)));
%% STEP 4 - Sample at rate 2/T %%%%%%%%%%%%%%%%%%%%%%%%%%%%%%%%%%%
yout = yout(1:OverSampleRate/2:end);
%% STEP 5 - Compute MMSE-DFE %%%%%%%%%%%%%%%%%%%%%%%%%%%%%%%%%%%
%% The MMSE-DFE filter coefficients computed below minimize mean-squared
%% error at the slicer input. The derivation follows from the fact that the
%% slicer input over the period of the data sequence can be expressed as
%% Z = (R+N)*W - X*[0 B]', where R and N are Toeplitz matrices constructed
%% from the signal and noise components, respectively, at the sampled
%% output of the antialiasing filter, W is the feedforward filter, X is a
%% Toeplitz matrix constructed from the input data sequence, and B is the
%% feedback filter. The computed W and B minimize the mean square error
%% between the input to the slicer and the transmitted sequence due to
%% residual ISI and Gaussian noise.
%% Compute the noise autocorrelation sequence at the output of the
%% antialiasing filter and rate-2/T sampler.
N0 = SymbolPeriod/(2 * Q0^2 * 10^(2*PAlloc/10));
Snn = N0/2 * fftshift(abs(H_r).^2) * 1/SymbolPeriod * OverSampleRate;
Rnn = real(ifft(Snn));
Corr = Rnn(1:OverSampleRate/2:end);
%% Construct a Toeplitz autocorrelation matrix.
C = toeplitz(Corr(1:EqNf));
%% Construct Toeplitz matrix from input data sequence
X = toeplitz(XmitData, [XmitData(1); XmitData(end:-1:end-EqNb+1)]);
%% Construct Toeplitz matrix from signal at output of 2/T sampler. This
%% sequence gets wrapped by equalizer delay
R = toeplitz(yout, [yout(1); yout(end:-1:end-EqNf+2)]);
R = [R(EqDel+1:end,:); R(1:EqDel,:)];
R = R(1:2:end, :);
%% Start of modifications to optimize offset
ONE=ones(PtrnLength,1);
%% Compute least-squares solution for filter coefficients
RINV = inv([R'*R+PtrnLength*C R'*ONE;ONE'*R ONE'*ONE]);
R=[R ONE]; % Add all-ones column to compute optimal offset
P = X'*X - X'*R*RINV*R'*X;
P01 = P(1,2:end);
P11 = P(2:end,2:end);
B = -inv(P11)*P01'; % Feedback filter
W = RINV*R'*X*[1;B]; % Feedforward filter
Z = R*W - X*[0;B]; % Input to slicer
%% STEP 6 - Compute BER using semi-analytic method %%%%%%%%%%%%%%%%%%%%%%
MseGaussian = W(1:end-1)'*C*W(1:end-1);
%% End of modifications to optimize offset
```

```
Ber = sum(0.5*erfc((abs(Z−0.5)/sqrt(MseGaussian))/sqrt(2)))/length(Z);
%%% STEP 7 - Compute equivalent SNR %%%%%%%%%%%%%%%%%%%%%%%%%%%%%%%%% This
%%% function computes the inverse of the Gaussian error probability
%%% function. The built-in function erfcinv( ) is not sensitive enough for
%%% the low probability of error case.
Q = inf;
if Ber>10^(−12) Q = sqrt(2)*erfinv(1−2*Ber);
elseif Ber>10^(−300) Q = 2.1143*(−1.0658−log10(Ber))^0.5024;
end
%%% STEP 8 - Compute penalty %%%%%%%%%%%%%%%%%%%%%%%%%%%%%%%%%%%%%%%
RefSNR = 10 * log10(Q0) + PAlloc;
TWDP = RefSNR−10*log10(Q)
% End of program
```

APPENDIX B

Sample MATLAB Code, Example 2

This MATLAB code illustrates various aspects of the invention. This version implements a DFE with 14 feedforward taps and 5 feedback taps. This code illustrates optimization of equalizer delay and sampling phase, where the optimization of equalizer delay is performed in an efficient manner. This version includes code that implements Method 2 for automatically estimating OMA and baseline from the input waveform and it includes automatic offset optimization This version computes TWDP for three different stressor channels, using the maximum of those as the reported TWDP value.

```
%%%%%%% MATLAB (R) script to compute TWDP %%%%%%%%%%%%%%%%%%%%%%%%%%%
%% TWDP inputs
%% The values given below for TxDataFile and MeasuredWaveformFile are
%% examples and should be replaced by actual path\filenames for each
%% waveform tested.
%% Transmit data file: The transmit data sequence is one of the TWDP test
%% patterns. The file format is ASCII with a single column of chronological
%% ones and zeros with no headers or footers.
TxDataFile = 'prbs9_950.txt';
%% Measured waveform: The waveform consists of exactly K samples per unit
%% interval T, where K is the oversampling rate. The waveform must be
%% circularly shifted to align with the data sequence. The file format for
%% the measured waveform is ASCII with a single column of chronological
%% numerical samples, in optical power, with no headers or footers.
MeasuredWaveformFile = 'preproc-1207-01.txt';
OverSampleRate = 16; % Oversampling rate, must be even
%% Simulated fiber responses, modeled as a set of ideal delta functions
%% with specified amplitudes in optical power and delays in nanoseconds.
%% FiberResp contains delays in row 1, corresponding power coefficients in
%% the other three rows. Rows 2, 3, and 4 each correspond to a differenct
%% fiber channel model. For this example, a TWDP value is computed for
%% each channel, and the TWDP reported is the maximum of the three TWDP
%% values thus computed. The vector 'Delays' contains the delays.
FiberResp = [...
     0.000000 0.072727 0.145455 0.218182
     0.158 0.176 0.499 0.167
     0.000 0.513 0.000 0.487
     0.254 0.453 0.155 0.138];
Delays = FiberResp(1,:)';
%% Program constants %%
SymbolPeriod = 1/10.3125; % Symbol period (ns)
EqNf = 14; EqNb = 5; % Number of feedforward and feedback equalizer taps
% Set search range for equalizer delay, specified in symbol periods. Lower
% end of range is minimum channel delay. Upper end of range is the sum of
% the lengths of the FFE and channel. Round up and add 5 to account for the
% antialiasing filter.
EqDelMin = floor(min(Delays)/SymbolPeriod);
EqDelMax = ceil(EqNf/2 + max(Delays)/SymbolPeriod)+5;
EqDelVec = [EqDelMin:EqDelMax];
PAlloc = 6.5; % Total allocated dispersion penalty (dBo)
Q0 = 7.03; % BER = 10^(−12)
N0 = SymbolPeriod/2 / (Q0 * 10^(PAlloc/10))^2;
EFilterBW = 7.5; % Antialiasing filter bandwidth (GHz)
%% Load input waveform and data sequence, generate filter and other
%% matrices
yout0 = load(MeasuredWaveformFile);
XmitData = load(TxDataFile);
PtrnLength = length(XmitData);
TotLen = PtrnLength*OverSampleRate;
Fgrid = [−TotLen/2:TotLen/2−1].'/(PtrnLength*SymbolPeriod);
% antialiasing filter
[b,a] = butter(4, 2*pi*EFilterBW,'s'); H_r = freqs(b,a,2*pi*Fgrid);
```

```
ExpArg = -j*2*pi*Fgrid;
ONE=ones(PtrnLength,1);
%% Normalize the received OMA to 1. Estimate the OMA of the captured
%% waveform by using a linear fit to estimate a pulse response, sythesize a
%% square wave, and calculate the OMA of the sythesized square wave per
%% Clause 52.9.5
ant=4; mem=40; %Anticipation and memory parameters for linear fit
X=zeros(ant+mem+1,PtrnLength); %Size data matrix for linear fit
Y=zeros(OverSampleRate,PtrnLength); %Size observation matrix for linear fit
for ind=1:ant+mem+1
    X(ind,:)=circshift(XmitData,ind-ant-1)';%Wrap appropriately for lin fit
end
X=[X;ones(1,PtrnLength)]; %The all-ones row is included to compute the bias
%Each column of Y is one bit period
for ind=1:OverSampleRate
    Y(ind,:)=yout0([0:PtrnLength-1]*OverSampleRate+ind)';
end
Qmat=Y*X'*(X*X')^(-1);
% Qmat is the coefficient matrix resulting from linear fit. Each column
% (except the last) is one bit period of the pulse response. The last
% column is the bias.
SqWvPer=16; %Even number; period of the square wave used to compute the OMA
SqWv=[zeros(SqWvPer/2,1);ones(SqWvPer/2,1)]; %One period of sq wave (col)
X=zeros(ant+mem+1,SqWvPer); %Size data matrix for synthesis
for ind=1:ant+mem+1
    X(ind,:)=circshift(SqWv,ind-ant-1)'; %Wrap appropriately for synthesis
end
X=[X;ones(1,SqWvPer)]; %Include the baseline
Y=Qmat*X;Y=Y(:); %Synthesize the modulated square wave, put into one column
%Set position in square wave to average over
avgpos=[.4*SqWvPer/2*OverSampleRate:.6*SqWvPer/2*OverSampleRate];
ZeroLevel=mean(Y(round(avgpos),:)); %Average over middle 20% of "zero" run
%Average over middle 20% of "one" run, compute OMA
MeasuredOMA=mean(Y(round(SqWvPer/2*OverSampleRate+avgpos),:))-ZeroLevel;
%% Subtract zero level and normalize OMA
yout0 = (yout0-ZeroLevel)/MeasuredOMA;
%% Compute the noise autocorrelation sequence at the output of the
%% front-end antialiasing filter and rate-2/T sampler.
Snn = N0/2 * fftshift(abs(H_r).^2) * 1/SymbolPeriod * OverSampleRate;
Rnn = real(ifft(Snn));
Corr = Rnn(1:OverSampleRate/2:end);
C = toeplitz(Corr(1:EqNf));
%% Compute the minimum slicer MSE and corresponding TWDP for the
%% three stressor fibers
% X matrix used in MSE calculation
X = toeplitz(XmitData, [XmitData(1); XmitData(end:-1:2)]);
Rxx = X'*X; %Used in MSE calculation
ChannelTWDP = [ ];
for ii=1:3 %index for stressor fiber
    %% Propagate the waveform through fiber ii.
    %% The DC response of each fiber is normalized to 1 (sum(PCoefs)=1)
    PCoefs = FiberResp(ii+1,:)';
    Hsys = exp(ExpArg * Delays') * PCoefs; Hx = fftshift(Hsys/sum(PCoefs));
    yout = real(ifft(fft(yout0).*Hx));
    %% Process signal through front-end antialiasing filter %%%%%%%%%%%%%%%%%
    yout = real(ifft(fft(yout) .* fftshift(H_r)));
    %% Compute MMSE-DFE %%%%%%%%%%%%%%%%%%%%%%%%%%%%%%%%%%%%%%
    %% The MMSE-DFE filter coefficients computed below minimize
    %% mean-squared error at the slicer input. The derivation follows from
    %% the fact that the slicer input over the period of the data sequence
    %% can be expressed as Z = (R+N) *W - X*[0 B]', where R and N are
    %% Toeplitz matrices constructed from the signal and noise components,
    %% respectively, at the sampled output of the antialiasing filter, W is
    %% the feedforward filter, X is a Toeplitz matrix constructed from the
    %% input data sequence, and B is the feedback filter. The computed W
    %% and B minimize the mean squared error between the input to the
    %% slicer and the transmitted sequence due to residual ISI and Gaussian
    %% noise. Minimize MSE over 2/T sampling phase and equalizer delay and
    %% determine BER
    MseOpt = Inf;
    % jj loop minimizes over sampling phase
    for jj= [0:OverSampleRate-1]-OverSampleRate/2
        %% Sample at rate 2/T with new phase (wrap around as required)
        yout_2overT = yout(mod([1:OverSampleRate/2:TotLen]+jj-1,TotLen)+1);
        Rout = toeplitz(yout_2overT,...
            [yout_2overT(1); yout_2overT(end:-1:end-EqNf+2)]);
        R = Rout(1:2:end, :);
        RINV = inv([R'*R+PtrnLength*C R'*ONE;ONE'*R PtrnLength]);
        R=[R ONE]; % Add all-ones column to compute optimal offset
        Rxr = X'*R; Px_r = Rxx - Rxr*RINV*Rxr';
```

-continued

```
%% kk loop minimizes MSE over equalizer delay, feedforward
%% coefficients, and feedback coefficients
    for kk = 1:length(EqDelVec)
        EqDel = EqDelVec(kk);
        SubRange = [EqDel+1:EqDel+EqNb+1];
        SubRange = mod(SubRange-1,PtrnLength)+1;
        P = Px_r(SubRange,SubRange);
        P00 = P(1,1); P01 = P(1,2:end); P11 = P(2:end,2:end);
        Mse = P00 - P01*inv(P11)*P01';
        if (Mse<MseOpt)
            MseOpt = Mse;
            B = -inv(P11)*P01'; % Feedback filter
            XSel = X(:,SubRange);
            W = RINV*R'*XSel*[1;B]; % Feedforward filter
            Z = R*W - XSel*[0;B]; % Input to slicer
            %% Compute BER using semi-analytic method %%%%%%%%%%%%%%%%%%%%
            MseGaussian = W(1:end-1)'*C*W(1:end-1);
            Ber = mean(0.5*erfc((abs(Z-0.5)/sqrt(MseGaussian))/sqrt(2)));
        end
    end
end
%% Compute equivalent SNR %%%%%%%%%%%%%%%%%%%%%%%%%%%%%%%%%%%%%
%% This function computes the inverse of the Gaussian error probability
%% function. The built-in function erfcinv( ) is not sensitive enough
%% for the low probability of error cases.
if Ber>10^(-12) Q = sqrt(2)*erfinv(1-2*Ber);
elseif Ber>10^(-323) Q = 2.1143*(-1.0658-log10(Ber)).^0.5024;
else Q = inf;
end
%% Compute penalty %%%%%%%%%%%%%%%%%%%%%%%%%%%%%%%%%%%%%%%%%%%%%
RefSNR = 10 * log10(Q0) + PAlloc;
ChannelTWDP(ii) = RefSNR-10*log10(Q);
end
%% Pick highest value due to the multiple fiber responses from ChannelTWDP.
TWDP = max(ChannelTWDP)
%% End of program
```

What is claimed is:

1. A computer-implemented method for testing a transmitter for a communications link, the method comprising a non-transitory processor executing software instructions to effect the steps of:

accessing a stored waveform for the transmitter under test, wherein the stored waveform is based on capture of an output generated by the transmitter in response to a data test pattern applied to the transmitter; and calculating a performance metric for the transmitter under test, wherein the performance metric is a difference between (a) SNR for reception by an ideal communications receiver and (b) SNR for a test communications link comprising the transmitter under test, a reference channel and a reference receiver, the reference receiver including an equalizer, the performance metric calculated based on simulated propagation of the waveform through the reference receiver.

2. The method of claim 1, wherein the reference channel comprises a microwave channel.

3. The method of claim 1, wherein the reference channel comprises a radio frequency channel.

4. The method of claim 1, wherein the reference channel comprises an optical channel.

5. The method of claim 1, wherein the reference channel comprises a cable.

6. The method of claim 1 wherein the equalizer includes a finite length equalizer.

7. The method of claim 1 wherein the equalizer includes an infinite length equalizer.

8. The method of claim 1 wherein the equalizer is not physically realizable in hardware.

9. The method of claim 1 wherein the step of calculating the performance metric comprises:

for each of a plurality of different reference channels, calculating a channel-specific performance metric, wherein the channel-specific performance metric is a difference between (a) SNR for reception by an ideal communications receiver and (b) SNR for a channel-specific test communications link comprising the transmitter under test, that specific reference channel and a reference receiver, the performance metric calculated based on simulated propagation of the waveform through the reference receiver; and determining the performance metric for the transmitter based on the channel-specific performance metrics.

10. The method of claim 9 wherein the step of determining the performance metric for the transmitter based on the channel-specific performance metrics comprises:

selecting the worst channel-specific performance metric as the performance metric for the transmitter.

11. The method of claim 1 further comprising:

accessing the data test pattern, wherein the step of calculating the performance metric includes use of the data test pattern.

12. The method of claim 1 wherein the step of calculating the performance metric utilizes a baseline of the captured waveform.

13. The method of claim 12 further comprising:

using the captured waveform to compute the baseline.

14. The method of claim 1 wherein the reference receiver includes an equalizer with a slicer, and the SNR for the test communications link is measured at an input to the slicer.

15. The method of claim 1 wherein the performance metric is based on compliance with a standard applicable to the transmitter.

16. The method of claim 1 further comprising:
applying the data test pattern to the transmitter under test;
capturing the output generated by the transmitter in response to the applied data test pattern; and
storing the waveform based on the captured output.

17. A computer-implemented method for testing a transmitter for a communications link, the method comprising a non-transitory processor executing software instructions to effect the steps of:
accessing a stored waveform for the transmitter under test, wherein the stored waveform is based on capture of an output generated by the transmitter in response to a data test pattern applied to the transmitter; and
calculating a performance metric for the transmitter under test, wherein the performance metric is a difference between (a) SNR for an ideal communications link, the ideal communications link including an ideal transmitter and an ideal channel that outputs a distortion-free version of a waveform based on the data test pattern and an ideal matched filter receiver; and (b) SNR for a test communications link comprising the transmitter under test, a reference channel and a reference receiver, the reference receiver including a decision feedback equalizer having a feedforward filter and a feedback filter and a slicer, the SNR for the test communications link measured at an input to the slicer; the performance metric calculated based on simulated propagation of the waveform through the reference receiver.

18. The method of claim 17, wherein the ideal channel comprises a microwave channel.

19. The method of claim 17, wherein the ideal channel comprises a radio frequency channel.

20. The method of claim 17, wherein the ideal channel comprises an optical channel.

21. The method of claim 17 wherein the step of calculating the performance metric comprises:
for each of a plurality of different reference channels, calculating a channel-specific performance metric, wherein the channel-specific performance metric is a difference between (a) SNR for reception by an ideal communications receiver and (b) SNR for a channel-specific test communications link comprising the transmitter under test, that specific reference channel and a reference receiver, the performance metric calculated based on simulated propagation of the waveform through the reference receiver; and
determining the performance metric for the transmitter based on the channel-specific performance metrics.

* * * * *